(12) United States Patent
Dukes et al.

(10) Patent No.: US 7,104,574 B2
(45) Date of Patent: Sep. 12, 2006

(54) CORRUGATED PIPE CONNECTION JOINT

(75) Inventors: Jerry A. Dukes, Aurora, CO (US); Thomas E. Ogden, Columbia, MO (US); Rodney Stude, Englewood, CO (US)

(73) Assignee: Uponor Eti Company, Denver, CO (US)

( * ) Notice: Subject to any disclaimer, the term of this patent is extended or adjusted under 35 U.S.C. 154(b) by 420 days.

(21) Appl. No.: 09/765,924

(22) Filed: Jan. 20, 2001

(65) Prior Publication Data

US 2001/0033080 A1 Oct. 25, 2001

Related U.S. Application Data

(60) Provisional application No. 60/177,162, filed on Jan. 20, 2000.

(51) Int. Cl.
*F16L 17/00* (2006.01)
*F16L 19/00* (2006.01)

(52) U.S. Cl. .................. 285/370; 285/903; 285/397

(58) Field of Classification Search ............ 285/66, 285/903, 369, 370, 397, 351
See application file for complete search history.

(56) References Cited

U.S. PATENT DOCUMENTS

| 677,142 | A | 6/1901 | Richardson et al. |
|---|---|---|---|
| 1,324,602 | A | 12/1919 | Lorenz |
| 2,304,793 | A | 12/1942 | Bodine, Jr. |
| 2,423,260 | A | 7/1947 | Slaughter |
| 2,668,987 | A | 2/1954 | Harris et al. |
| 2,724,672 | A | 11/1955 | Rubin |
| 2,794,758 | A | 6/1957 | Harper et al. |
| 2,896,976 | A | 7/1959 | Wiltse |
| 2,955,318 | A | 10/1960 | Cook et al. |

(Continued)

FOREIGN PATENT DOCUMENTS

| BE | 682774 | 6/1966 |
|---|---|---|
| CA | 1 194 264 | 10/1982 |

(Continued)

OTHER PUBLICATIONS

Author Unknown, "News Release", http:..www.csrpipesystems.com.uliner.coolprojectos.html, Jan. 5, 1999.
Author Unknown, "Product Information", http:..www-.milkriteusa.com.productinfo.com, Jan. 5, 1999.
Author Unknown, "Press Release", http:..www.ultraliner.com.Library.nsf, Apr. 2, 1998.
Author Unknown, "Product Information", http:..www-.milkriteusa.com.productinfo.com, Jan. 5, 1999.
Denn, Charlie, "A "Pipe Line" to the Future", *Construction*, Oct. 28, 1996.

*Primary Examiner*—Lynne Browne
*Assistant Examiner*—Aaron Dunwoody
(74) *Attorney, Agent, or Firm*—Dorsey & Whitney LLP (57) ABSTRACT

A corrugated pipe connection joint structure and method for connecting two sections of corrugated pipe. The joint structure includes opposing bell-formed ends with reduced corrugations, a connector insert including a gasket on either end and a push-ring. The gasket(s) form a seal sufficient to keep fluid inside the pipe, and to help keep the joint structure from separating under normal use.

3 Claims, 8 Drawing Sheets

U.S. PATENT DOCUMENTS

| | | | |
|---|---|---|---|
| 2,971,225 A | 2/1961 | Woodruff et al. | |
| 2,974,758 A | 3/1961 | Ekholm | |
| 2,980,161 A | 4/1961 | Howard | |
| 3,029,073 A | 4/1962 | Wright | |
| 3,192,612 A | 7/1965 | Elliott et al. | |
| 3,230,129 A | 1/1966 | Kelly | |
| 3,326,738 A | 6/1967 | McLaughlin | |
| 3,335,758 A | 8/1967 | Bertolet, Jr. | |
| 3,371,770 A | 3/1968 | Graham et al. | |
| 3,392,867 A | 7/1968 | Morris | |
| 3,429,954 A | 2/1969 | Atkins et al. | |
| 3,494,813 A | 2/1970 | Lawrence et al. | |
| 3,543,334 A | 12/1970 | Sudo | |
| 3,560,295 A | 2/1971 | Kimbrell et al. | |
| 3,602,263 A | 8/1971 | Bremner | |
| 3,677,676 A | 7/1972 | Hegler | |
| 3,755,524 A | 8/1973 | McKay | |
| 3,758,361 A | 9/1973 | Hunter | |
| 3,794,364 A | 2/1974 | Williams | |
| 3,856,905 A | 12/1974 | Dawson | |
| 3,897,090 A | 7/1975 | Maroschak | |
| 3,897,530 A | 7/1975 | Leathers | |
| 3,899,198 A | 8/1975 | Maroschak | |
| 3,913,400 A | 10/1975 | Floren | |
| 3,926,222 A | 12/1975 | Shiroy et al. | |
| 3,927,164 A | 12/1975 | Shimabukuro | |
| 3,929,359 A | 12/1975 | Schmunk et al. | |
| 3,958,425 A | 5/1976 | Maroschak | |
| 3,959,424 A | 5/1976 | Dawson et al. | |
| 3,961,528 A | 6/1976 | Ford | |
| 3,996,967 A | 12/1976 | Takada | |
| 4,020,136 A | 4/1977 | Zaro | |
| 4,028,037 A | 6/1977 | Dawson | |
| 4,054,211 A | 10/1977 | Moseley | |
| 4,082,327 A | 4/1978 | Sting et al. | |
| 4,132,047 A | 1/1979 | Gerigk et al. | |
| 4,190,942 A | 3/1980 | Tucker | |
| 4,202,568 A | 5/1980 | Ström | |
| 4,207,130 A | 6/1980 | Barber | |
| 4,215,798 A | 8/1980 | Patterson et al. | |
| 4,233,022 A | 11/1980 | Brady et al. | |
| 4,233,101 A | 11/1980 | Scragg et al. | |
| 4,273,605 A | 6/1981 | Ross | |
| 4,304,415 A | 12/1981 | Wolf et al. | |
| 4,305,282 A | 12/1981 | Hunt | |
| 4,321,740 A | 3/1982 | Davis et al. | |
| 4,361,451 A | 11/1982 | Renaud | |
| 4,368,091 A | 1/1983 | Ontsuga et al. | |
| 4,377,894 A | 3/1983 | Yoshida | |
| 4,394,202 A | 7/1983 | Thomas et al. | |
| 4,410,391 A | 10/1983 | Thomas et al. | |
| 4,421,711 A | 12/1983 | Bonnebat et al. | |
| 4,427,480 A | 1/1984 | Kamuro et al. | |
| 4,446,891 A | 5/1984 | Gebelius | |
| 4,448,825 A | 5/1984 | Asahara | |
| 4,483,167 A | 11/1984 | Hayashi | |
| 4,496,499 A | 1/1985 | Brittain et al. | |
| 4,504,171 A | 3/1985 | Florence, Jr. | |
| 4,560,295 A | 12/1985 | Fujiwara et al. | |
| 4,584,158 A | 4/1986 | Nilsson et al. | |
| 4,614,113 A | 9/1986 | Daghe et al. | |
| 4,625,601 A | 12/1986 | Brummet | |
| 4,627,471 A | 12/1986 | Parkes et al. | |
| 4,637,756 A | 1/1987 | Boles | |
| 4,643,855 A | 2/1987 | Parkes et al. | |
| 4,647,072 A | 3/1987 | Westman | |
| 4,650,703 A | 3/1987 | Kleinheins, Gerhard H. | |
| 4,691,740 A | 9/1987 | Svetlik et al. | |
| 4,702,502 A | 10/1987 | Shade et al. | |
| 4,724,108 A | 2/1988 | Jurgenlohmann et al. | |
| 4,752,208 A * | 6/1988 | Iwata et al. | 285/903 |
| 4,754,781 A | 7/1988 | Jan de Putter | |
| 4,779,651 A | 10/1988 | Hegler et al. | |
| 4,813,281 A | 3/1989 | Daghe | |
| 4,846,660 A | 7/1989 | Drossbach | |
| 4,863,365 A | 9/1989 | Ledoux et al. | |
| 4,865,357 A | 9/1989 | Brinegar | |
| 4,867,921 A | 9/1989 | Stekette, Jr. | |
| 4,878,285 A | 11/1989 | Carstensen | |
| 4,900,503 A | 2/1990 | Hegler et al. | |
| 4,900,651 A | 2/1990 | Ishikawa et al. | |
| 4,914,939 A | 4/1990 | Brinegar | |
| 4,915,425 A | 4/1990 | Hegler et al. | |
| 4,946,206 A | 8/1990 | Roe et al. | |
| 4,969,670 A | 11/1990 | Bonnema et al. | |
| 4,974,440 A | 12/1990 | Brinegar | |
| 4,985,196 A | 1/1991 | LeDoux et al. | |
| 4,986,951 A | 1/1991 | Ledoux et al. | |
| 5,034,180 A | 7/1991 | Steketee, Jr. | |
| 5,071,173 A | 12/1991 | Hegler et al. | |
| 5,091,137 A | 2/1992 | LeDoux | |
| 5,112,211 A | 5/1992 | LeDoux et al. | |
| 5,124,109 A | 6/1992 | Drossbach | |
| 5,148,837 A | 9/1992 | Agren et al. | |
| 5,244,624 A | 9/1993 | Stekette, Jr. | |
| 5,249,697 A | 10/1993 | McKinnon | |
| 5,326,138 A | 7/1994 | Claes et al. | |
| 5,342,570 A | 8/1994 | Ledoux et al. | |
| 5,361,799 A | 11/1994 | Chilton et al. | |
| 5,362,114 A | 11/1994 | Levingston | |
| 5,368,809 A | 11/1994 | Steketee, Jr. | |
| 5,380,121 A | 1/1995 | Schluter | |
| 5,382,113 A | 1/1995 | Chilton et al. | |
| 5,383,693 A | 1/1995 | Shade | |
| 5,397,513 A | 3/1995 | Steketee, Jr. | |
| 5,403,120 A | 4/1995 | Stekette, Jr. | |
| 5,415,440 A | 5/1995 | Kanao | |
| 5,447,665 A | 9/1995 | Steketee, Jr. | |
| 5,469,891 A | 11/1995 | Lund et al. | |
| 5,480,196 A * | 1/1996 | Adams, Jr. | 285/531 |
| 5,564,857 A | 10/1996 | Schluter | |
| 5,566,984 A * | 10/1996 | Abbema et al. | 285/351 |
| 5,587,126 A | 12/1996 | Steketee, Jr. | |
| 5,589,131 A | 12/1996 | Steketee, Jr. | |
| 5,644,832 A | 7/1997 | Kanao | |
| 5,707,088 A | 1/1998 | Miller et al. | |
| 5,713,608 A * | 2/1998 | Yang | 285/397 |
| 5,842,727 A | 12/1998 | Shade | |
| 5,862,581 A | 1/1999 | Miller et al. | |

FOREIGN PATENT DOCUMENTS

| | | |
|---|---|---|
| CH | 536 703 | 5/1973 |
| DE | 3519439 A1 | 12/1985 |
| EP | 0 000 576 A1 | 2/1979 |
| EP | 0 060 670 A2 | 9/1982 |
| EP | 0 065 886 A1 | 12/1982 |
| EP | 0 098 547 | 1/1984 |
| FR | 1 394 807 | 3/1966 |
| FR | 2 487 702 | 2/1982 |
| FR | 3 503 622 | 10/1982 |
| GB | 275964 | 3/1928 |
| GB | 807413 | 1/1959 |
| GB | 1 340 068 | 12/1973 |
| GB | 1 352 829 | 5/1974 |
| GB | 1 437 273 | 5/1976 |
| GB | 2 003 576 A | 3/1979 |
| GB | 1 553 408 | 9/1979 |
| GB | 2 018 384 A | 10/1979 |
| GB | 2 042 673 A | 9/1980 |
| GB | 1 580 438 | 12/1980 |
| GB | 2 080 917 A | 2/1982 |

| | | | | | | |
|---|---|---|---|---|---|---|
| GB | 2 084 686 A | 4/1982 | JP | 60-252884 | | 12/1985 |
| GB | 2 094 862 A | 9/1982 | JP | 5118484 | * | 5/1993 |
| GB | 2 184 194 A | 6/1987 | WO | WO 87/03840 | | 7/1987 |
| GB | 2 186 340 A | 8/1987 | WO | WO 88/04987 | | 7/1988 |
| GB | 2 188 695 A | 10/1987 | WO | WO 94/12336 | | 6/1994 |
| JP | 55-34969 | 3/1980 | | | | |
| JP | 55-49225 | 4/1980 | * cited by examiner | | | |
| JP | 55-93413 | 7/1980 | | | | |

CORRUGATED PIPE CONNECTION JOINT

The present application claims priority from U.S. Provisional Application Ser. No. 60/177,162, filed on Jan. 20, 2000. The contents of that Provisional Application are hereby incorporated by reference as though fully set forth herein.

FIELD OF THE INVENTION

The instant invention relates to corrugated pipe systems, and more particularly to a structure for use in joining sections of corrugated pipe.

BACKGROUND OF THE INVENTION

Corrugated pipe is used for many purposes, such as for public utilities reasons, including the transport of water, waste and other materials. In the installation of corrugated pipe, several sections of pipe are fitted together to the desired length using a pipe connection joint. Problems arise when the pipe connection joint is not relatively watertight, does not allow some longitudinal offset between adjacent sections for applications in which the length of pipe is not completely straight, is not easily used, and cannot be easily fabricated at the construction site. Existing pipe connection joints are relatively effective, but are subject to the above-mentioned problems.

It is with respect to these considerations and other background information relative to prior art pipe connectors that the significant improvements of the present invention have evolved.

SUMMARY OF THE INVENTION

The present invention, in general terms, concerns a corrugated pipe connection joint that is substantially leak-proof, and is convenient to construct and use. The present invention includes a corrugated pipe connection joint structure for joining two sections of corrugated pipe each having a bell-formed end, a connector insert defining opposing ends and a push-ring, and at least one gasket positioned on at least one of the opposing ends of the connector insert wherein the opposing ends of the connector insert are each positioned in a bell-formed end of a pipe section, with the corresponding at least one gasket forming a seal therebetween.

The present invention further includes a corrugated pipe connector insert including a pair of opposing ends, each capable of fitting into a bell-formed end on a section of pipe in which the bell-formed ends have an inner diameter greater than an outer diameter of the opposing ends of the insert, at least one gasket positioned on at least one of the opposing ends having an outer diameter greater than inner diameter of the bell-formed ends, and a push-ring disposed between the opposing ends having an outer diameter substantially equal to an outer diameter of the bell formed ends.

The present invention also includes a method for joining two corrugated pipe sections including the steps of bell-forming at least one end of a first corrugated pipe section and at least one end of a second corrugated pipe section, reducing corrugations at the bell-formed ends of the first and second corrugated pipe sections, inserting a connector insert having a first end and a second end into the first and second bell-formed ends of the corrugated pipe sections, respectively.

The present invention advantageously provides a corrugated pipe connection joint and method for connecting two pieces of corrugated pipe, which is relatively watertight, allows for longitudinal offset between adjacent sections and is easily fabricated at the construction site.

The foregoing and other features, utilities and advantages of the invention will be apparent from the following more particular description of preferred embodiments of the invention as illustrated in the accompanying drawings and defined in the appended claims.

DETAILED DESCRIPTION OF PREFERRED EMBODIMENTS

Corrugated pipe connection joints are used to connect sections of corrugated pipe during installation. Corrugated pipe is used for many purposes, generally including, but not limited to, public utilities uses. These uses generally require long lengths of corrugated pipe, sometimes extending for very long distances. Unfortunately, however, corrugated pipe is typically made in sections of approximately fifty feet due to both production and transport limitations. Therefore, installation of corrugated pipe often requires several sections to be connected together. Pipe connection joints are used to connect these relatively short sections of corrugated pipe to create longer, continuous sections suitable for common applications and uses.

Corrugated pipe is well known in the art, and is made of an inner wall and an outer wall. The inner wall is smooth, and defines an inner diameter. The outer wall is corrugated, and defines an outer diameter. The corrugated outer wall can have spiral corrugations, which is one continuous corrugation spiraling around the outside of the inner wall along the length of a pipe section, or concentric ring corrugation, where each corrugation is formed by a separate ring formed around the outside of the inner wall. Corrugated pipe of this type is typically made of polyvinylchloride (PVC), high-density polyethylene (HDPE), acrylonitrile/butadiene/styrene terpolymer (ABS) or any other such material having the characteristics as described below and suitable for the intended use. The materials and construction of corrugated pipe are generally known to those skilled in the art.

The examples herein are described using a pipe made with concentric ring corrugations, but could be used equally with a pipe made with spiral ring corrugations. Also, while the examples set forth herein are for corrugated pipe of relatively large size (inside diameters of between 23.5 inches and 35.5 inches, commonly referred to in the industry as 24 inch and 36 inch pipe, respectively), this invention is contemplated for use in corrugated pipe having larger and smaller diameters.

Figure 1:
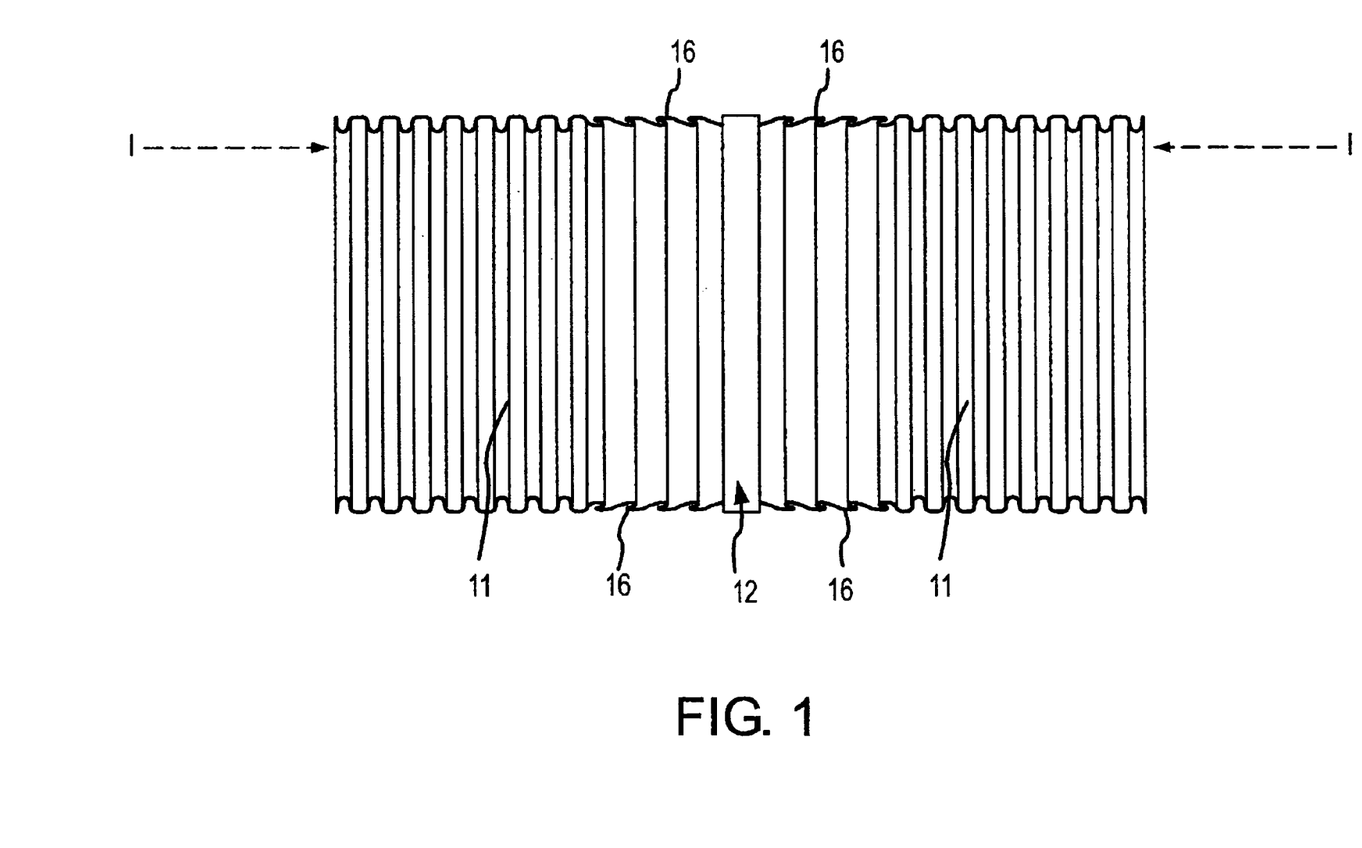
FIG. 1 is a side elevation view of two adjacent corrugated pipe sections joined by a connector insert, forming the joint structure of the present invention.

Referring first to FIG. 1, two standard corrugated pipe sections 11 are shown joined together by a pipe joint connection according to the present invention. This pipe connection joint is virtually seamless in that the outer diameter of the connector insert 12 is substantially equal to the outer diameter of the corrugated pipe sections 11. This particular joint resists disconnection well, creates a good seal and is easy to fabricate because of the structure of the connector insert 12 and the method of forming the joint, both of which will be described in more detail below.

Figure 1A:
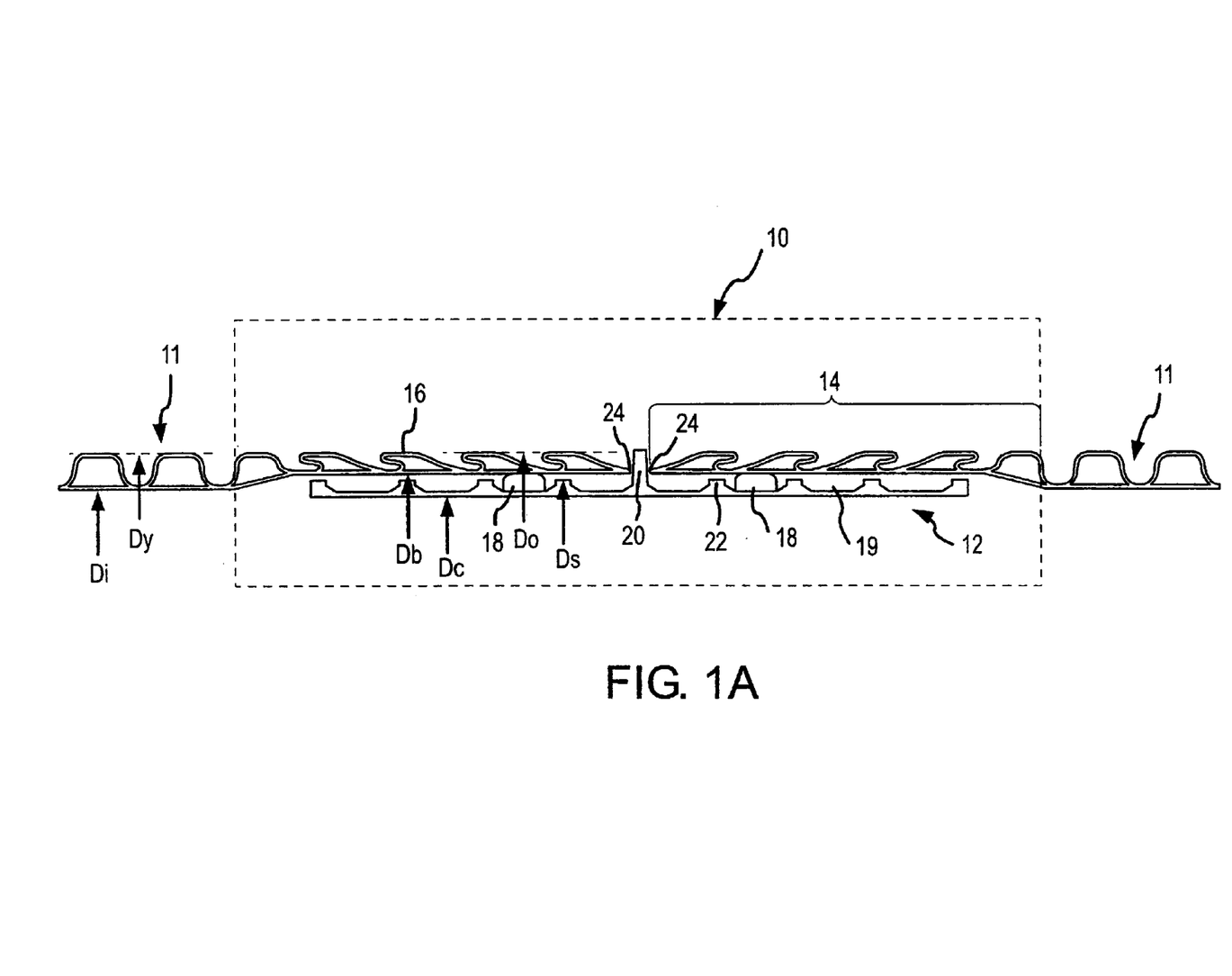
FIG. 1A is a partial section taken through line I—I of FIG. 1 showing two adjacent corrugated pipe sections connected by a pipe connection joint according to the present invention having bell-formed ends joined by a first embodiment of a connector insert having flanges, a push-ring and two gaskets.

FIG. 1A is a section taken through line I of FIG. 1 which shows a pipe connection joint 10 according to the present invention joining two adjacent standard pipe sections 11. The pipe connection joint 10 preferably includes opposing bell-formed ends 14, a connector insert 12, and at least one gasket 18. The standard pipe sections 11 have an inner diameter of $D_I$ and an outer diameter of $D_y$. The critical dimensions in a pipe connection joint 10 are its outer diameter, $D_o$, and its inner diameter, $D_c$. The outer diameter, $D_o$, of the pipe connection joint 10 should preferably be substantially the same dimension as the outer diameter $D_y$ of the standard pipe sections 11, with acceptable variations being up to about 0.5 inches larger than the outer diameter, $D_y$, of the standard pipe sections 11 (larger variations are possible but generally not acceptable in the industry). This keeps the pipe connection joint 10 from protruding outwardly excessively.

This is particularly important where the newly jointed pipe is being used in "slip-lining" applications. Slip-lining is a process in which new pipe is used as a liner for older pre-existing pipe and is effectively pushed into place from one end of the older host pipe. In slip-lining applications it is important that the outer diameter of the joint 10 does not exceed the outer diameter of the pipe sections $D_y$, so that the new pipe does not snag, or those incidences are significantly reduced, on the pre-existing host pipe as it is inserted into place. It is also important that the contact between bell-formed ends 14 and the connector insert 12 (described in more detail below) is strong enough to support the force associated with pushing a large number of pipe sections into a host pipe. Preferably, the inner diameter of the pipe joint, $D_c$, should be approximately the same as the inner diameter, $D_I$, of the standard pipe section 11, so as to minimize impedance of the material flowing through connected standard pipe sections.

Figure 2:
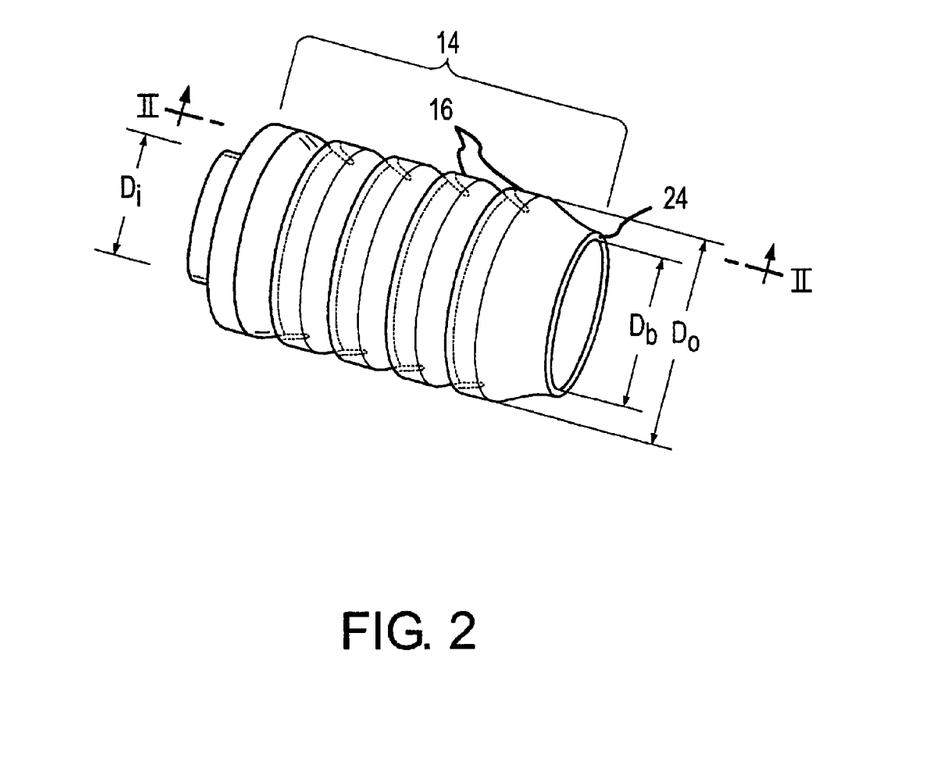
FIG. 2 is a perspective view of a corrugated pipe section having bell-formed ends and showing one standard corrugation and several reduced corrugations. A number of the corrugations have not been shown to identify the bell-formed end more clearly.

The pipe connection joint structure includes a bell-formed end 14 as shown in FIG. 2 on each adjacent end of the standard pipe sections 11 to be connected. FIG. 2 shows only a portion of the corrugations present on the standard corrugated pipe sections 11 solely for purposes of clarity.

The bell-formed end 14 is formed by heating the end of the pipe until the material of the pipe is pliable and able to be expanded around a mold or insert of the desired size to increase the inner diameter from $D_I$ to $D_b$. A suitable time and temperature for such a process is about 400° F. for about five minutes. After cooling, the bell-formed end 14 retains its new shape and regains substantially all of its original material characteristics. The inner diameter $D_b$ of the bell-formed section 14, or end, can be anywhere from approximately two to three inches greater than the inner diameter $D_I$ of the standard pipe section. The bell-formed section 14 on each end of adjacent pipe sections 11 to be connected is preferably approximately two to five inches in length or about ½ the length of the connector insert 12.

Figure 2A:
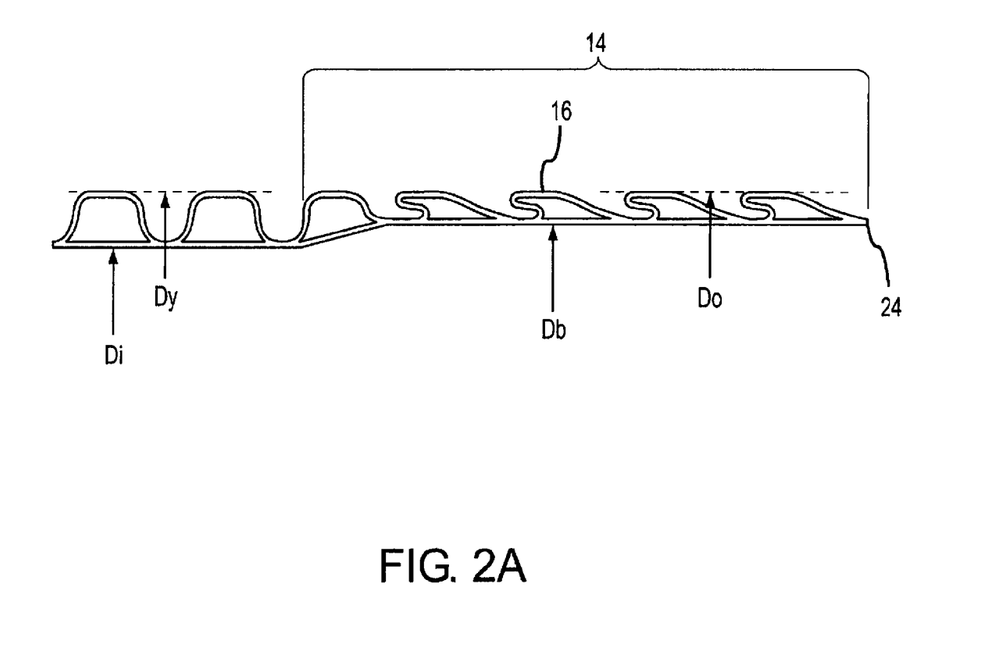
FIG. 2A is a partial section taken through line II—II of FIG. 2 showing one bell-formed end of one of the adjacent pipe sections shown in FIGS. 1 and 1A.

The corrugations are then reduced, either by bending, removing (at least partially) or otherwise deforming, to maintain an outer diameter $D_o$ substantially the same as the outer diameter $D_y$ of the standard pipe section (See FIGS. 2 and 2A). This reduction is preferably achieved by heating the outer corrugations and forcing a mold (not shown) having an inner diameter of at least approximately $D_y$ over the pliable corrugations to bend the corrugations over as shown in FIGS. 1, 1A, 2 and 2A as reference number 16. A suitable time and temperature for such a process is about 400° F. for about five minutes. After cooling, the reduced corrugations 16 retain their new shape and regain substantially all of their original material characteristics. This corrugation-deforming step can be done before, concurrently with, or after the respective end 14 has been expanded in the bell-forming step. Both the bell-forming and corrugation reducing steps can easily take place at the job site or where the pipe is manufactured.

Figure 3:
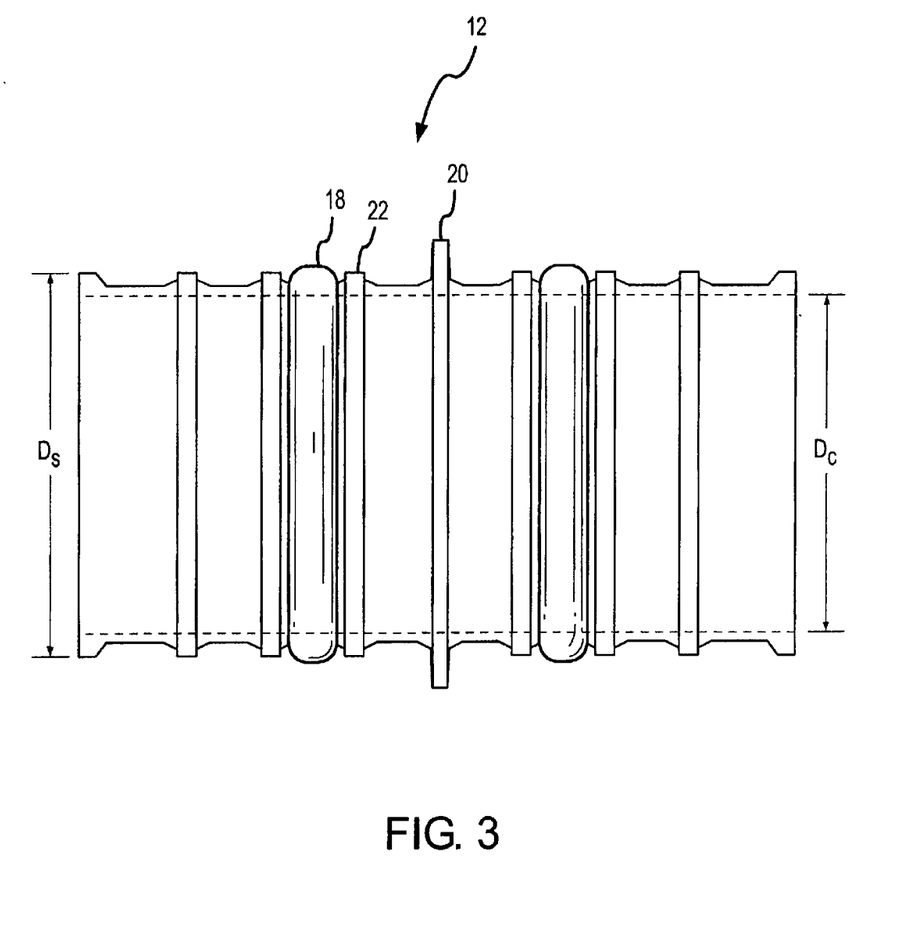
FIG. 3 is a side elevation view of the connector insert shown in FIG. 1A.
Figure 4:
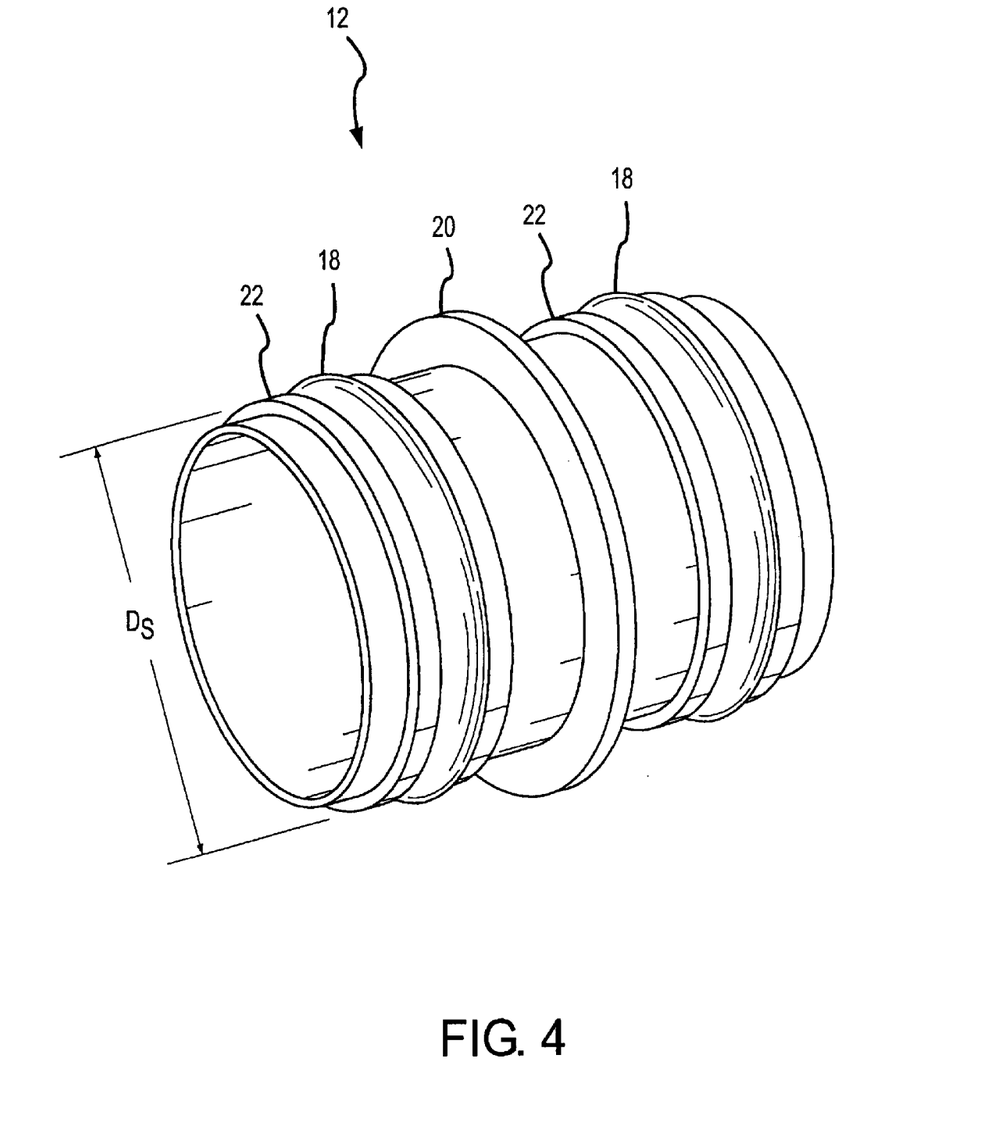
FIG. 4 is a perspective view of the connector insert shown in FIGS. 1A and 3.

The pipe connection joint 10 also includes a connector insert 12, which enables the two bell-formed ends 14 of the corrugated pipe sections 11 to be connected together. FIG. 3 shows a side elevation view of a first embodiment of a connector insert 12 in accordance with the present invention. FIG. 4 shows a perspective view of the same first embodiment.

Referring to FIGS. 3 and 4, the connector insert 12 is generally tubular in shape. The connector insert 12 preferably has at least one flange 22, at least one gasket 18 and a push-ring 20 located near the length-wise midpoint of the insert 12 defining a pair of opposing ends. The connector insert 12 has in inner diameter, $D_c$, which is preferably substantially equal to the inner diameter of the pipe sections, $D_I$, and an outer diameter, $D_s$, which is substantially equal to, and preferably just less than the inner diameter of the bell-formed end, $D_b$ (See FIG. 1A). The inner surface of the connector insert 12 is generally smooth, and the outer surface defines at least one flange 22 on either end, preferably concentrically positioned, and at spaced-apart intervals if more than one flange 22 is present. The outer diameter, $D_s$, of the connector insert 12 is measured at the outermost point of the flange(s) 22. The flange(s) 22, or rib(s), can be continuous or sectioned. As shown in FIG. 3, there are four equally-spaced flanges 22 on either end of the connector insert, with a gasket retaining channel 19 formed between each adjacent pair of flanges 22.

At least one annular rubber or elastomer gasket 18 is preferably positioned around the connector insert 12, preferably positioned in a channel 19 to be held in place by the adjacent flanges 22. More preferably, at least two gaskets 18 are positioned around the connector insert 12, one on each opposing end of the connector insert 12. More than one gasket 18 on either end can be used, if desired, for a particular application in which water tightness is of critical importance.

The gaskets 18 are sized to fit snugly against the connector insert 12. The gaskets 18 are preferably located proximate to the flange(s) 22 and are held in place during insertion and retraction of the connector insert 12 into the corrugated pipe sections 11 by the flange(s) 22. The gaskets 18, when positioned on the connector insert 12, have an outside diameter of approximately 0.25 inches greater than $D_s$, resulting in an outer diameter greater than $D_b$, such that the gaskets 18 are compressed when the connector insert 12 is positioned in the bell-formed end 14 of the pipe section 11, as described in greater detail below. The compression of the gaskets 18 creates the seal between the corrugated pipe sections and the connector insert 12 and further provides an increased level of friction. This increased level of friction increases the strength of the joint 10 and keeps the joint from separating during use.

A push-ring 20 is formed at about the length-wise midpoint of the connector insert 12, and is an annular flange that preferably extends at right angles to the connector insert 12. The outer diameter of the push-ring 20 is at a maximum preferably substantially equal to the outer diameter, $D_y$, of the standard pipe section, and outer diameter, $D_o$, of the conformed corrugations on the bell-formed end. In other words, the length the push-ring 20 extends radially from $D_c$ is the difference between $D_y$ and $D_i$. The diameter of the push-ring 20 is also preferably about one inch greater than $D_s$. The minimum diameter of the push-ring 20 is between $D_b$ and $D_y$, so that the outer perimeter of the bell-formed end 14 can contact the push-ring 20. The push-ring 20 is preferably integrally formed on the connector insert 12 but may also be a separate ring securely attached around the outside of the connector insert 12. As described below, it can also be one corrugation not reduced by the steps indicated above.

When connected to the bell-formed ends 14, the push-ring contacts with the external rim 24 of the bell-formed end. The strength of the joint at the contact between the external rim 24 and the push-ring 20 is particularly important when being used for the slip-lining applications described above. Therefore, the thickness of the push-ring 20 typically ranges from about 0.25 inches to about 0.5 inches or more as needed for particularly long slip-lining applications.

The connector insert 12 has a pair of opposing ends, which extend axially outward to either side of the push-ring 20 a sufficient distance to reach the beginning of each bell-formed section 14 of the pipe sections 11 to be connected.

The connector insert 12 is preferably a thermoplastic or polymer material, such as HDPE, PVC or any other suitable material sufficient to perform the function as described herein, which anyone of ordinary skill in the art would know. The material that the connector insert 12 is made of is not critical to the invention so long as the material has sufficient qualities to perform in the uses described herein. The connector insert 12 is preferably prefabricated to have the structure described above. The connector insert 12 may be machined, molded, or cast of a suitable material with properties sufficient to withstand the use as described herein. In emergency situations where prefabricated connector inserts 12 are not readily available, or in situations in which a tight seal is not a concern, a small section of standard corrugated pipe may be modified to act as a connector insert 12. In this situation, the flanges may be formed by shaving down, cutting, or otherwise removing the corrugations of the standard corrugated pipe. A corrugation, which is not reduced, may act as the push-ring 20 in this situation.

In the operation of forming the pipe joint connection 10 of the present invention, a bell-formed end 14 is first formed on the adjacent ends of two pipe sections 11 to be connected together. The corrugations on each bell-formed end 14 are then reduced in height to have the same outer diameter $D_o$ as the outer diameter of the standard pipe section $D_y$. This step can occur before, concurrently with, or after the bell-formed ends 14 are made as previously discussed above. A connector insert 12 is then provided, having the requisite retaining flange(s) 22 for the gasket(s) 18, and the push-ring 20.

At least one gasket 18 is then circumferentially positioned over each end of the connector insert 12, and held in place by respective positioning flanges 22. The first end of the connector insert 12 is then inserted into one of the bell-formed ends 14 until the outer rim 24 of the bell-formed end engages the push-ring 20 (See FIG. 1A). At this point, the first end of the connector insert 12 is adjacent to the end of the bell-formed end section of the pipe 24, and the gasket 18 forms a seal between the outer surface of the connector insert 12 and the inner surface of the bell-formed end 14. The second end of the connector insert 12 is then inserted into the other bell-formed end 14, with the connector insert 12 held in place by the push-ring 20. The connector insert 12 is pushed into the bell-formed end 14, or the other bell-formed end 14 is pushed over the second end of the connector insert 12, until the outer rim 24 of the other bell-formed end engages the push-ring 20. The second end of the connector insert 12 is also adjacent to the end 24 of the other bell-formed end section of the pipe 11. The pipe joint connection 10 is now formed, and the two sections of corrugated pipe 11 are connected together (See FIG. 1A) in a sealed manner. As described above, the seals formed by the gaskets 18 also help keep the joint 10 from separating under normal use. This resistance to separation is created by the friction of the gaskets 18 on the connector insert 12 and the pipe sections as well as the tight press-fit arrangement.

The advantages of this joint structure are many. A primary benefit is that the joint structure can be made in the field at the construction site using typical tools normally available, or easily acquired. The connector insert 12 can be prefabricated or in emergent situations, constructed as needed.

The joint structure can also be taken apart for maintenance or disassembly, and put back together relatively easily by generally reversing the steps set forth above.

In addition, the corrugated pipe joint structure allows some longitudinal offset deflection between adjacent pipe sections, depending on the length of the connector insert 12 positioned in the respective bell-formed end 14. The pipe sections are offset with respect to the connector insert 12 by angling the pipe section relative to the connector insert to the extent allowed by the gasket compressibility. Some bending due to flexibility of the pipe sections and the connector insert can also occur. Shorter connector inserts 12 allow for greater flexibility in the pipe connection joint 10. The shorter the pipe section, the more offset angles can be formed between pipe sections in a given overall length, thus minimizing the radius of curvature allowed by the jointed pipe structure.

For the above embodiment shown in FIGS. 1A, 3 and 4, the following dimensions, in inches, are typical but not exclusive:

$D_x$=23.5+/−0.05

$D_y$=25.6+/−0.04

$D_b$=24.6+/−0.05

$D_i$=23.5+/−0.05

$D_s$=24.5+/−0.05

$D_o$=25.6+/−0.05

Figure 5:
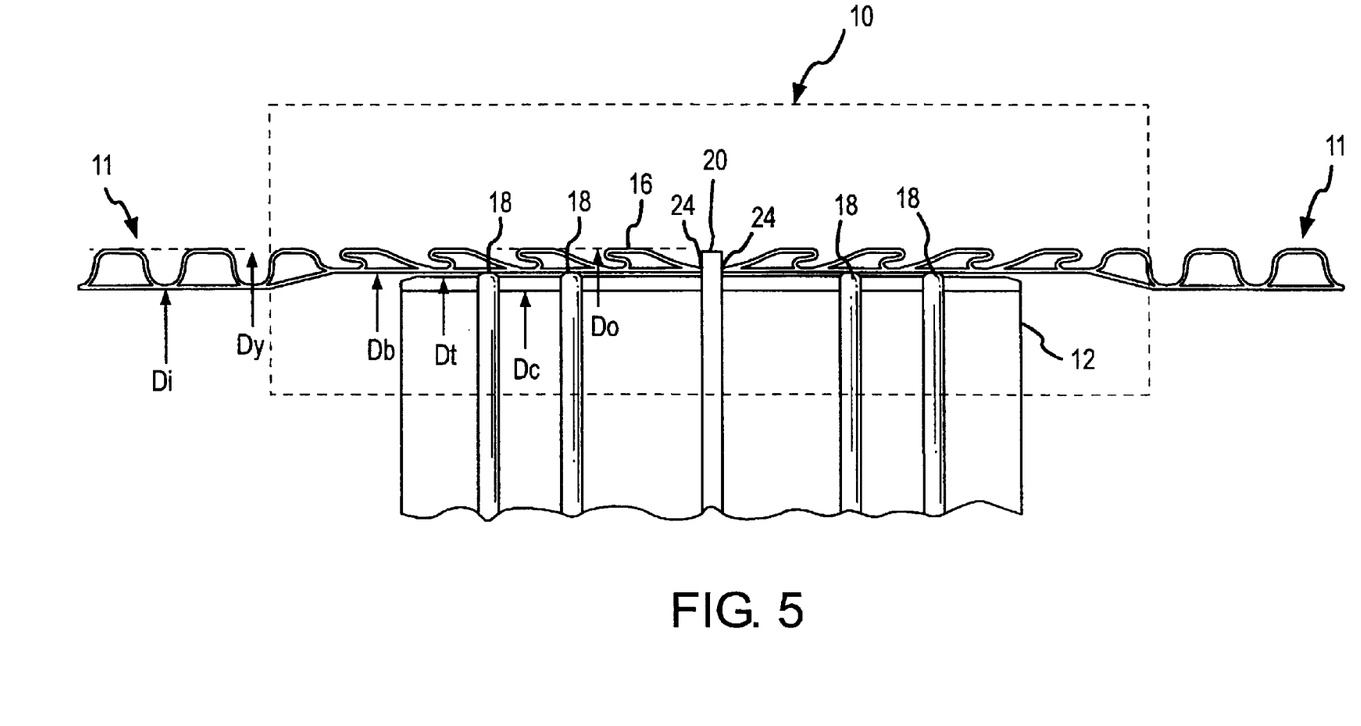
FIG. 5 is a partial section taken through line I of FIG. 1 showing two adjacent corrugated pipe sections connected by a pipe connection joint according to the present invention having bell-formed ends joined by a second embodiment of the connector insert having a smooth outer diameter, four gaskets and a push-ring.
Figure 6:
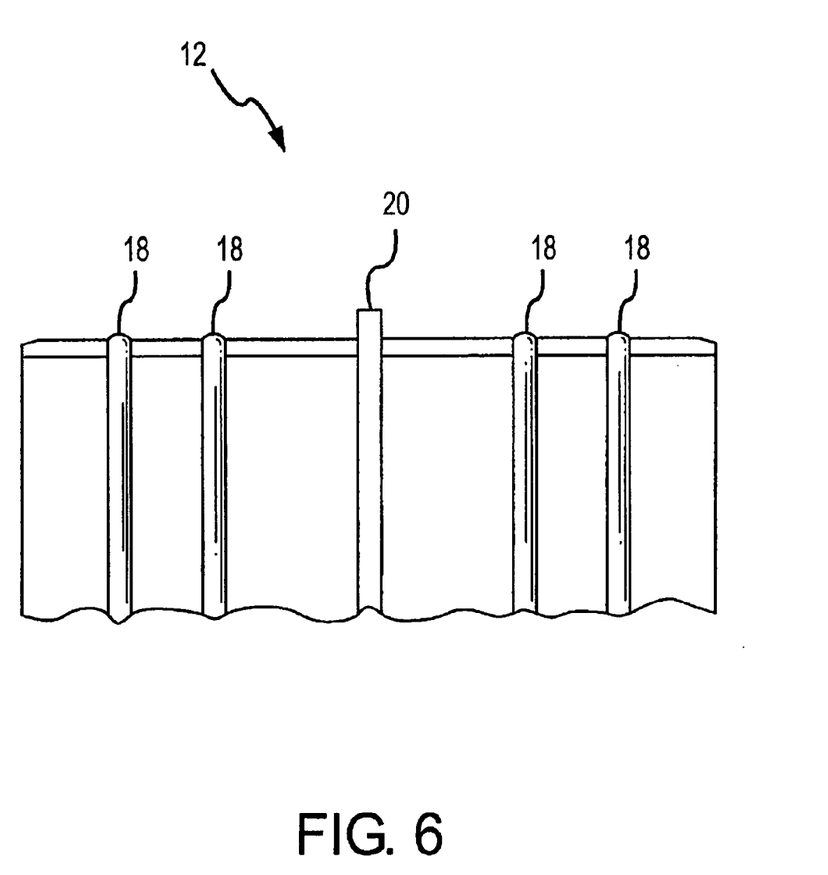
FIG. 6 is a partial section of the connector insert shown in FIG. 5.

FIGS. 5 and 6 show an alternative embodiment similar to that described above. The bell-formed ends 14 and reduced corrugations 16, with diameter dimensions $D_l$, $D_y$, $D_b$, and $D_o$ are similar to that described above. The connector insert 12 in this embodiment also is similar to that described above, in that it is generally tubular in shape, and has a smooth-walled inner diameter $D_c$, and a push-ring 20. The differences, however, are that the outer surface of this connector insert 12 is relatively smooth and has at least one annular groove (not shown) on either end for receiving and retaining a gasket 18 therein. The outer surface has an outer diameter dimension of $D_l$, which is less than the inner diameter of the bell-formed end 14. Each gasket 18, which could be an O-ring in this embodiment, has a thickness so that when positioned in its respective annular groove, it preferably is compressed between the inner wall of the bell-formed end 14 and the connector insert 12 forming a tight seal. Again, this compression also increases the level of friction between the bell-formed end and the connector insert thereby increasing the strength of the overall joint 10 and keeping the joint from separating during use.

The method of forming the joint 10 is similar to that described with respect to the first embodiment, except that the connector insert 12 does not have to have the positioning flange(s) 22 for holding the gasket(s) 18, but instead utilizes annular grooves for positioning the gasket(s) 18.

Presently preferred embodiments of the present invention and many of its improvements have been described with a degree of particularity. The previous description is of preferred examples for implementing the invention, and the scope of the invention should not necessarily be limited by this description. The scope of the present invention is defined by the scope of the following claims.

We claim:

1. A method for joining two corrugated pipe sections comprising the steps of:

bell-forming at least one end of a first corrugated pipe section and at least one end of a second corrugated pipe section;

reducing an amount of corrugations at said bell-formed ends of said first and second corrugated pipe sections;

inserting a connector insert having a first end and a second end adapted to fit within said first and second bell-formed ends of said corrugated pipe sections into said first bell-formed end of said corrugated pipe section; and inserting said second bell-formed corrugated pipe section over said second end of said connector insert.

2. The method for joining two corrugated pipe sections of claim 1, wherein said reducing step further comprises reducing said corrugations in height.

3. The method for joining two corrugated pipe sections of claim 1, wherein said bell-forming step further comprises heating said at least one end of said first and said second ends of corrugated pipe section and molding said first and second ends of corrugated pipe section.

* * * * *